United States Patent [19]

Morikawa et al.

[11] Patent Number: 5,671,892
[45] Date of Patent: Sep. 30, 1997

[54] SHEARING MACHINE

[75] Inventors: Sumio Morikawa, Sakai; Nobuyuki Zakohji, Toyonaka, both of Japan

[73] Assignee: Ohyodo Diesel Co., Ltd., Osaka, Japan

[21] Appl. No.: 544,389

[22] Filed: Oct. 10, 1995

[30] Foreign Application Priority Data

Oct. 13, 1994 [JP] Japan .................... 6-247380

[51] Int. Cl.⁶ .................. B02C 1/06; B02C 1/10
[52] U.S. Cl. .................. 241/101.73; 241/266; 241/300; 30/134
[58] Field of Search .................. 241/101.73, 266, 241/300; 30/134

[56] References Cited

U.S. PATENT DOCUMENTS

| | | | |
|---|---|---|---|
| 4,838,493 | 6/1989 | Labounty | 241/101.7 |
| 5,224,268 | 7/1993 | Pemberton | |
| 5,359,775 | 11/1994 | Morikawa et al. | 30/134 |
| 5,471,747 | 12/1995 | Morikawa et al. | 30/134 |
| 5,474,242 | 12/1995 | Rafn | 241/101.73 X |
| 5,531,007 | 7/1996 | Labounty | 30/134 |
| 5,533,682 | 7/1996 | De Gier et al. | 241/101.73 |

FOREIGN PATENT DOCUMENTS

| | | |
|---|---|---|
| 42 25 186 | 10/1993 | Germany . |
| 2126938 | 4/1984 | United Kingdom . |

*Primary Examiner*—John M. Husar
*Attorney, Agent, or Firm*—Armstrong, Westerman, Hattori, McLeland & Naughton

[57] ABSTRACT

The shearing machine is designed to surely shear an object to be sheared with less amount of power without causing slips. A plurality of lower shear blades mounted on a lower jaw member are arranged such that the arrangement of the cutting edges forms a convexity curved downward. The front edge portion of each shear blade inwardly protrudes from an adjacent rear edge portion of each forward adjacent shear blade. A plurality of upper shear blades mounted on an upper jaw member are arranged such that the arrangement of the cutting edges forms a convexity curved upward. The front edge portion of each shear blade inwardly protrudes from an adjacent rear edge portion of each forward adjacent shear blade.

12 Claims, 6 Drawing Sheets

SHEARING MACHINE

FIELD OF THE INVENTION

The present invention relates to a shearing machine for shearing and/or demolishing steel materials, iron frame structures, steel scrap, or the like.

BACKGROUND OF THE INVENTION

Shearing machines have been used to shear and demolish objects to be sheared such as iron frame structures, or the like, while opening and closing upper and lower jaw members connected with each other like scissors. As shown in FIG. 6, such a shearing machine 60 is usually attached on a leading edge portion of an arm 62 of a work machine such as a power shovel 61, tractor, or the like. In this kind of shearing machine, objects to be sheared 63 tend to slip forward when being sheared. Namely, depending on a configuration, material or position of the object being held to be sheared 63, shear blades 66, 67 mounted on each of the upper and lower jaw members 64, 65 may not cut into the object to be sheared 63, thereby causing the object to be sheared 63 to slip forward during the closing operation of the jaw members 64, 65.

One type shearing machine shown in FIG. 7 has been made to inhibit the forward slipping of the object. This shearing machine 70 is equipped with a plurality of shearing blades 73, 74 on the upper and lower jaw members 71, 72. The cutting edges of the shearing blades form steps. In detail, the shear blades 73, 74 are arranged such that each rear edge portion A, A' of the shear blades protrudes as compared to each adjacent front edge portion B, B' of the adjacent shear blades located closer to the proximal end of the jaw members 71, 72.

In this shearing machine, when the upper jaw member 71 is closed with the lower jaw member 72 held stationary at a standstill, the object to be sheared 63 will slip forward to some extent along the upper and lower jaw members, and then the object will be stopped by the rear edge portions A, A' of the upper and lower shear blades 73, 74. Thus, the object to be sheared 63 will be prevented from slipping forward and will be sheared according to the closing movement of the upper jaw member 71.

FIG. 8 shows another known shearing machine 80 having a pair of upper and lower shear blades 81, 82, each mounted on upper and lower jaw members 83, 84 and arranged in a reverse V-shape and V-shape, respectively. This machine restrains the object to be sheared from moving back and forth. As a result, the object is sheared certainly, without slipping forward.

The shearing machine shown in FIG. 7, however, has following problems. In this shearing machine, the shear blades 73, 74 receive large forward pressure via the rear edge portions A, A' because the rear edge portions A, A' of the shear blades 73, 74 are designed to prevent the object to be sheared 63 from slipping forward. Therefore, in the event that the mounting strength of the shear blades 73, 74 is insufficient, the shear blades 73, 74 are in danger of dropping out of the jaw members 71, 72 and being pushed, or blown off, toward the open front end. Furthermore, much of the closing power of the upper jaw member 71 is transformed into forward pushing power of the object to be sheared 63, power for shearing the object to be sheared 63 is decreased and the shear blades 73, 74 cannot easily cut into the object to be sheared 63. Therefore, there is a possibility that when one gives closing power to the upper jaw member 71, this may allow the rear edge portions A, A' to cut into the object to be sheared 63, but may not allow it to shear the object.

On the other hand, the shearing machine shown in FIG. 8 has disadvantages, such as having difficulty in cutting into the object to be sheared 63 and requiring a large power to shear it because every contact portion between each of the shear blades 81, 82 and the object 63 is along generally flat faces.

In addition, shearing machines are more convenient if the machine has a pickup function in addition to a shearing function. For example, demolished parts lying on the ground and/or structures such as pipelines installed near the ground must be lifted up and sheared. In other cases, demolished structures must be lifted up and carried to another place, such as a dump truck, without being sheared.

In most conventional shearing machines, however, such a pickup function has not being considered. As shown in FIGS. 7 to 9, in most conventional shearing machines, the leading edge of the distal end of a lower jaw member 72 or 84 is not arranged on a trajectory of the leading edge of the distal end of an upper jaw member 71 or 83 during opening and closing of the jaw members (Note: the trajectories are illustrated by arrows in FIGS. 7–9). Thereby, the leading edge portions of the upper and lower jaw members do not conform with each other when the upper jaw member 71, 83 is closed, and thus fail to grip objects well.

SUMMARY OF THE INVENTION

A first object of the present invention is to present a shearing machine which can securely shear an object to be sheared with minimum power and without causing forward slipping of the object.

A second object of the present invention is to present a shearing machine with a pick up function which enables securely picking up objects, such as structures lying on the ground or structures installed near the ground.

In view of the foregoing objects, the present invention provides a shearing machine comprising a shearing machine body having a pair of jaw members rotatably connected with each other so as to open and close like scissors, a plurality of shear blades arranged in series on each occluding portion of said jaw members, and a bracket for rotatably supporting said shearing machine body, wherein said bracket is attached to an arm of a work machine, and wherein the shear blades mounted on each jaw member are arranged such that the arrangement of cutting edges of the shear blades forms a convexity curved in an opening direction of the jaw members with the front edge portion of at least one of the shear blades inwardly protruded compared to an adjacent rear edge portion of one of forward adjacent shear blades.

A leading edge portion of one of the jaw members may be arranged on an open and close trajectory of a leading edge portion of the other jaw member, and one of the leading edge portions may be divided into two parts so as to fit the other leading edge portion therebetween, and that upper nose faces of the two parts may be arranged on the same flat plane.

At least one of the jaw members may be equipped with a supporting face stepped outward in an open-close direction of the jaw members compared to cutting edges of the shear blades attached on at least one of the jaw members.

A shearing machine desirably further comprises a rotation braking mechanism interposed between the bracket and the shearing machine body to fasten the shearing machine body to an arm until a certain amount of rotational force is applied to the shearing machine body.

With the object to be sheared positioned between occluding portions of both the jaw members, when one of the jaw members is closed, the object is sheared perpendicularly by the shear blades mounted on both the jaws members.

In detail, the cutting edge and the front edge portion of each shear blade cut into and shear the object to be sheared. The arrangement of the shear blades forming a convexity curved in an opening direction of the upper and lower jaw members makes a larger contact angle α (shown in FIG. 4) between the object to be sheared and the shear blade than that in machines as shown in FIGS. 6–7. Therefore, the object to be sheared receives small forward horizontal component of a shearing force, but rather receives backward pulling force. Thus, with the object to be sheared kept at the original position, the object can be smoothly sheared without slipping. At this time, the front edge portion of each shear blade receives a backward pushing pressure, but the amount of the pressure is rather small. And, this structure allows one to attach a stopper firmly behind the most backward shear blade. Therefore, each shear blade can be prevented from coming off.

Since at least two contact portions, among the contact portions between the shear blade and the object to be sheared, are edge lines at the front edge portions of the shear blades, the shear blades more easily cut into the object to be sheared, compared to shear blades in a conventional shearing machine in which all contact portions of each blade and an object to be sheared are along generally flat faces (see FIGS. 8 and FIG. 9).

According to another aspect of the present invention, a leading edge portion of one of the jaw members may be arranged on an open and close trajectory of a leading edge portion of the other jaw member, one of the leading edge portions may be divided into two parts so as to fit the other leading edge portion therebetween, and the upper nose faces of the two parts may be arranged on a generally common flat plane. Accordingly, this shearing machine can securely lift a demolished structure, or the like, on the ground without changing the orientation of the object, because the lifted demolished structure, or the like, is supported by three portions, i.e., two divided leading edge portions of one of the jaw members and one leading edge portion of the other jaw member.

According to further aspect, at least one of the jaw members may be equipped with a supporting face stepped outward in an open-close direction of the jaw members compared to cutting edges of the shear blades attached on at least one of the jaw members. In this shearing machine, an object to be sheared is set declined between the upper and lower shear blades. Thus, the upper and lower shear blades contact the object to be sheared along edge lines, thereby enabling both the shear blades to easily cut into the object to be sheared (see FIG. 5).

According to further aspect, a shearing machine may further comprise a rotation braking mechanism interposed between the bracket and the shearing machine body to fasten the shearing machine body to the bracket until a certain amount of rotational force is applied to the shearing machine body. In this shearing machine, a certain exceeded rotational force, applied to the shearing machine body, makes the shearing machine body rotate to the most appropriate orientation. Accordingly, even in the event that a large rotational moment acts on both of the jaw members when shearing and initially prevents shearing an object to be sheared, the rotation braking mechanism absorbs the torsion to orient the shearing machine body so as to shear the object at an optimized angle.

BRIEF EXPLANATION OF THE DRAWINGS

The above-mentioned, and other, objects, features and advantages of the present invention will be discussed in the following detailed explanations with reference to the accompanying drawings.

DESCRIPTION OF THE PREFERRED EMBODIMENT

A preferred embodiment of the present invention will be described with reference to FIG. 1 to FIG. 5.

Figure 1:
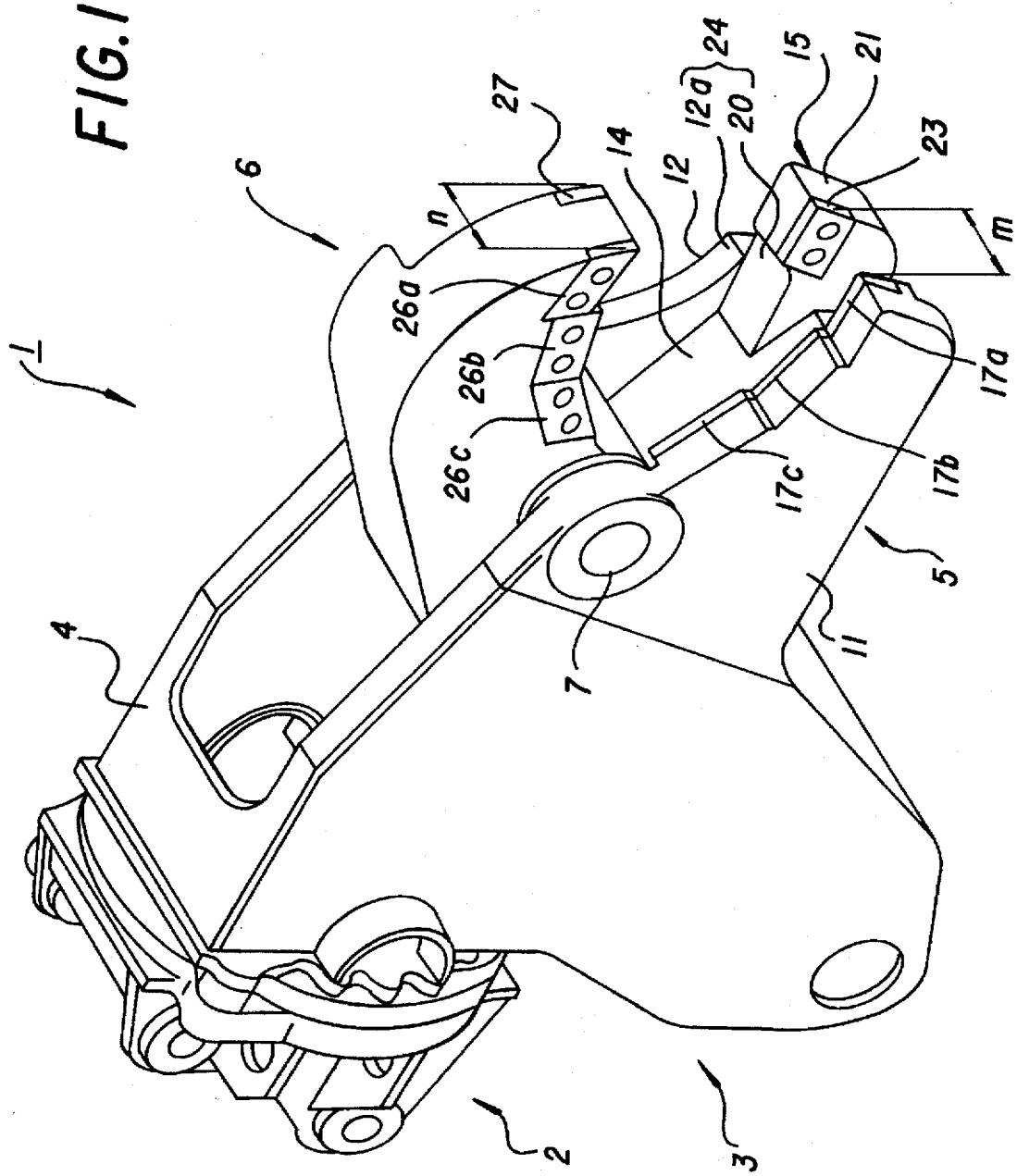
FIG. 1 shows a perspective view seen from the left front side of the shearing machine according to the present invention.
Figure 2:
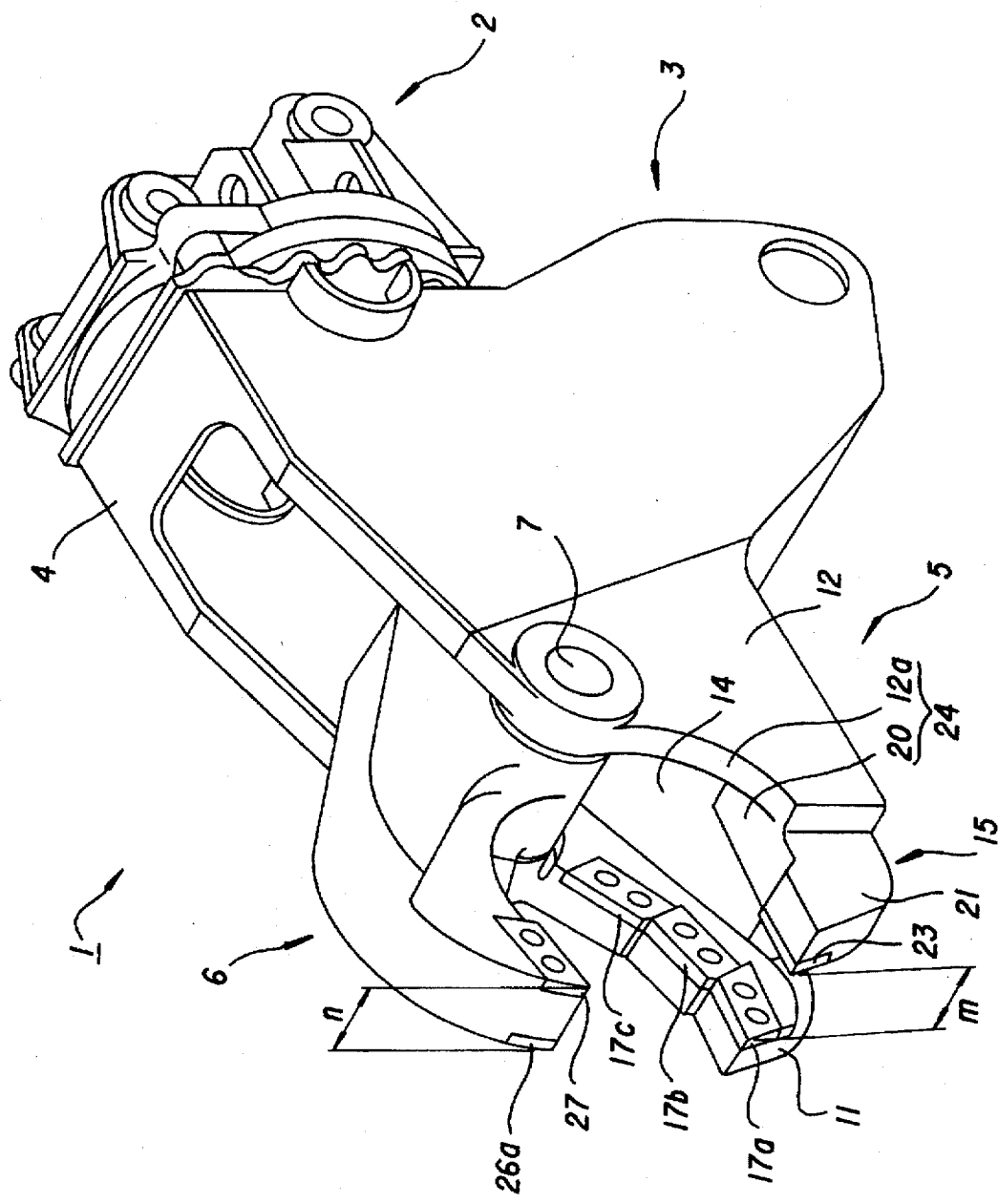
FIG. 2 shows a perspective view seen from the right front side of the shearing machine according to the present invention.
Figure 3:
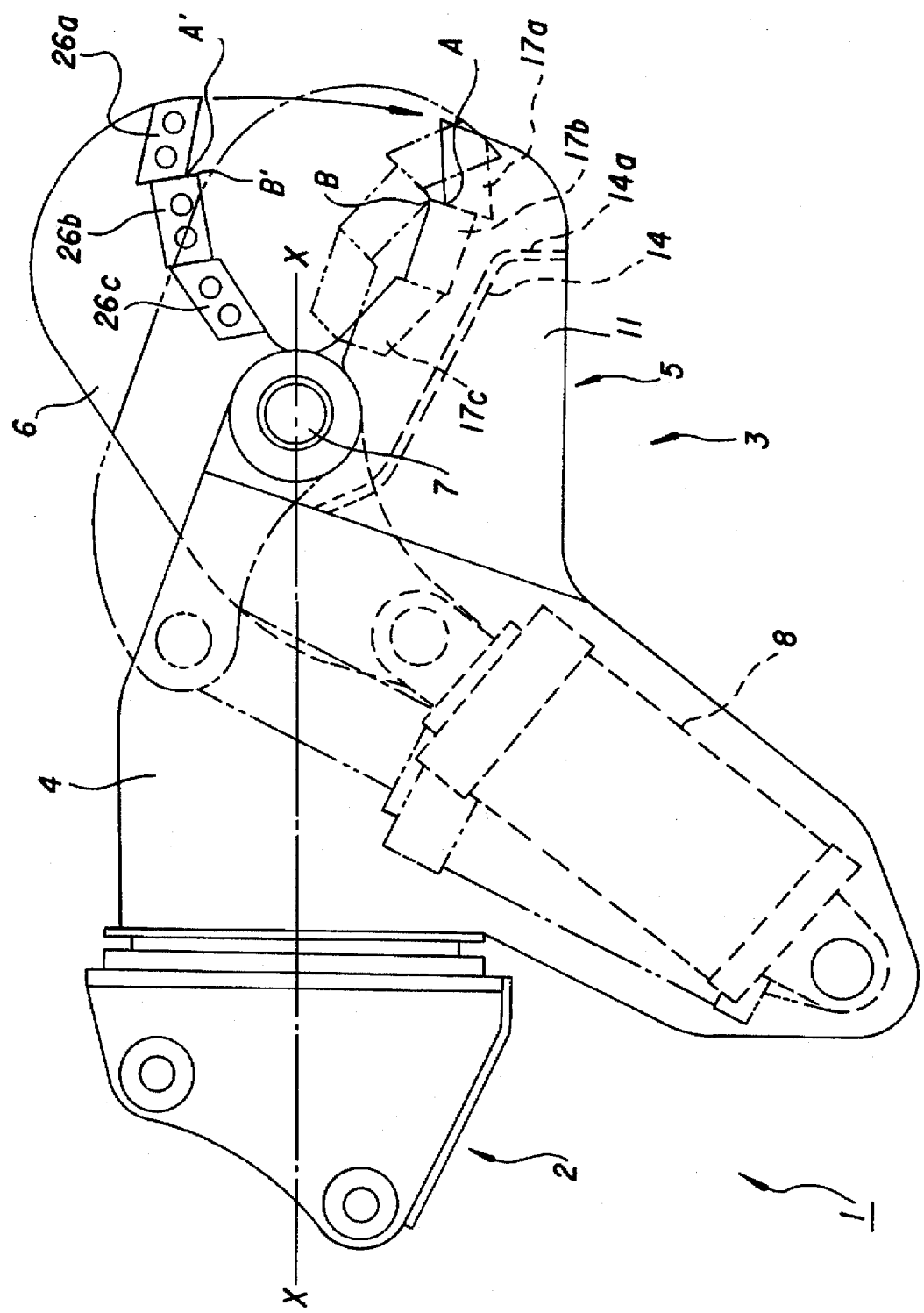
FIG. 3 shows a side view of the shearing machine according to the present invention.

As shown in FIG. 1 to FIG. 3, the shearing machine 1 includes a bracket 2 fixed on a leading edge of an arm of a work machine, such as a power shovel, or the like, and a shearing machine body 3 rotatably supported on the bracket 2. In the bracket 2, a hydraulic motor (not shown) which rotates the shearing machine body 3 around the X—X axis, shown in FIG. 3, is provided.

The shearing machine body 3 comprises a hollow base member 4 and a pair of jaw members 5, 6 connected with each other like scissors. The lower jaw member 5 is fixed to the base member 4. The upper jaw member 6 is rotatably connected to a main shaft 7 attached to the lower jaw member 5, and the proximal end portion of the upper jaw member 6 is rotatably connected to the leading end portion of the piston rod of the hydraulic cylinder 8, shown in FIG. 3, equipped in the base member 4. Thus, as shown in FIG. 3, the upper jaw member 6 opens and closes about the still lower jaw member 5 when the piston of the hydraulic cylinder 8 is reciprocated.

The lower jaw member 5 comprises a pair of side plates 11, 12, a connection plate 14 interposed between and connecting the side plates 11, 12 and having a downwardly bent leading end portion 14a, and a protruding portion 15 which forwardly protrudes along the right-hand side plate 12 (hereinafter referred to as "supporting side plate") as seen from the front in FIG. 2. The protruding portion 15 and a left-hand side plate 11 (hereinafter referred to as "shearing side plate") as seen from the front in FIG. 2 are elongated forwardly beyond the front end face 14a of connection plate 14 shown in FIG. 3 to form divided or bifurcated portions. Both leading edge portions of the side plate 11 and the protruding portion 15 are arranged on an open and close trajectory of the leading edge portion of the upper jaw member 6 as shown by an arrow in FIG. 3.

The upper inside portion of the shearing side plate 11 is equipped with a plurality of, for instance three, thick lower shear blades 17a, 17b, 17c arranged in series. The lower shear blades 17a, 17b, 17c are arranged such that the upper surfaces thereof including the cutting edges form a downward convexity. In other words, the arrangement of the cutting edges forms a convexity curved in an opening direction of the jaw members 5. Each lower shear blade 17a, 17b, 17c is arranged staircase-fashion such that the front edge portion B of the adjacent rearward shear blade (for example 17b) inwardly protrudes compared to an adjacent rear edge portion A of the adjacent forward shear blade (for example 17a). The upper face of the shearing side plate 11 is formed staircase-fashion in conformity with cutting edges of the lower shear blades 17a, 17b, 17c as shown in FIGS. 1 and 2.

The protruding portion 15 consists of a base portion 20 and a blade mounting portion 21 formed on the leading edge of the base portion 20. The upper surface of the base portion 20 is positioned lower than the upper surface of the leading edge of the blade mounting portion 21. The upper surface of the blade mounting portion 21 and the upper surface of the leading edge of the shearing side plate 11 are positioned on a common flat plane, as shown in FIGS. 1 and 2.

The blade mounting portion 21 is equipped with, at upper inside portion thereof, a thick lower shear blade 23 with its cutting edge being conformed to the upper surface of the blade mounting portion 21. This lower shear blade 23 has the same (or a mirrored) configuration as the shear blade 17a, which is the distal one of the shear blades 17a, 17b, 17c mounted on the shearing side plate 11. The lower shear blade 23 has the same orientation as that of the shear blade 17a.

The upper surface 12a of the supporting side plate 12 is in the form of a smooth circular arc and is positioned lower than the upper surface of the shearing side plate 11. This upper surface 12a of the supporting side plate 12 and the base portion 20 function as a supporting face 24 to support an object to be sheared with the object inclining as will be mentioned herein below.

The upper jaw member 6 is formed to have a width n slightly smaller than the width m between the shearing side plate 11 and the protruding portion 15 so as to be smoothly inserted therebetween. The upper jaw member 6 is equipped with, at the left lower side thereof when viewed from the front in FIG. 1, three upper shear blades 26a, 26b, 26c arranged in series and corresponding to the lower shear blades 17a, 17b, 17c.

Each upper shear blade 26a, 26b, 26c is arranged such that the lower surfaces including the cutting edges form an upward convexity. In other words, the arrangement of the cutting edges forms a convexity curved in an opening direction of the jaw members 6. As shown in FIG. 3, each upper shear blade 26a, 26b, 26c is arranged staircase-fashion such that the front edge portion B' of the adjacent rearward shear blade (for example 26b) inwardly protrudes compared to an adjacent rear edge portion A' of the adjacent forward shear blade (for example 26a). The lower surface of the upper jaw member 6 is formed staircase-fashion in conformity with cutting edges of the upper shear blades 26a, 26b, 26c.

The upper jaw member 6 is equipped with, at the right lower side thereof when viewed from the front in FIG. 2, an upper shear blade 27 with the cutting edge thereof conformed to the lower surface of the upper jaw member 6. The upper shear blade 27 has the same (or a mirrored) configuration as the shear blade 26a, which is the distal one of the three shear blades 26a, 26b, 26c. The position of the upper shear blade 27 is opposite to and conformed to that of the shear blade 26a.

In this embodiment, each of shear blades 17a, 23 and 26a, 27 mounted on the leading edge portions of the lower and upper jaw members 5 and 6, is shaped in the form of a parallelogram having a sharp leading edge to easily break through wall-like structures to be demolished. Therefore, a higher demolishing ability can be obtained.

A rotator and a rotation braking mechanism (not shown) are equipped between the shearing machine body 3 and the bracket 2. The rotation braking mechanism normally prevents the shearing machine body 3 from rotating by exerting friction between two plates, one of which is provided with the shearing machine body 3 and the other bracket 2, being pressed against each other by an elastic force of a spring, or the like. However, when a larger rotational force than the friction force is exerted to the shearing machine body 3, the two plates slip to rotate the shearing machine body 3 around the axis X—X, thereby enabling self attitude control of the shearing machine body 3.

Figure 4:
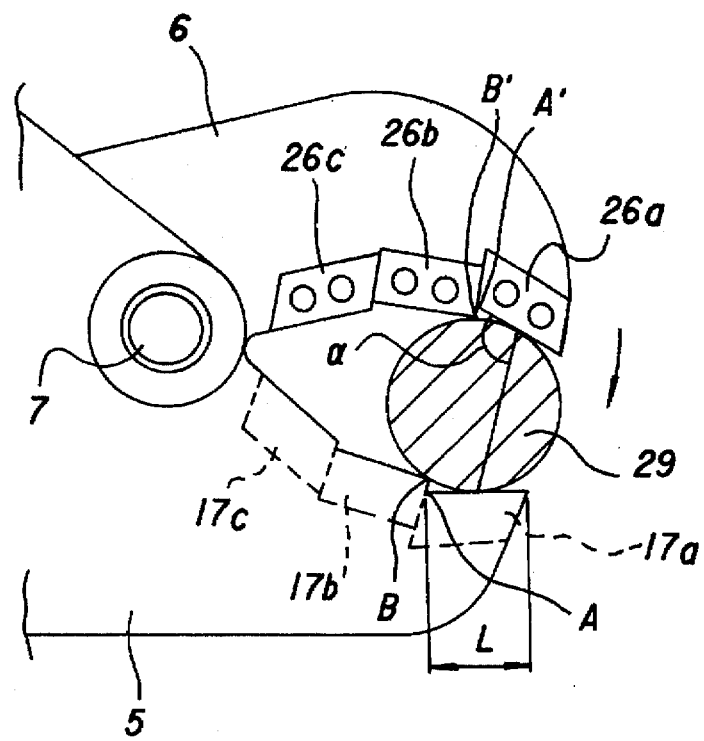
FIG. 4 shows a fragmental side view of the shearing machine according to the present invention when shearing the object to be sheared.

In this shearing machine, as shown in FIG. 4, when the upper jaw member 6 is closed, with a rod-like object 29 to be sheared interposed between the lower and upper jaw member 5, 6, the object to be sheared 29 is sheared by the engagement of the upper shear blades 17a, 17b, 17c and the lower shear blades 26a, 26b, 26c. In detail, cutting edges of the shear blades (in the illustration of FIG. 4, cutting edges of the shear blades 17a, 26a in the front row) and front edge portions of the shear blades (in the illustration, front edge portions B, B' of the central shear blades 17b, 26b) cut into and shear the object to be sheared 29.

In the event that the object to be sheared 29 is a plate-like object having a width shorter than the length of the shear blades 17a, 26a in the front row, the object to be sheared 29 extending across the shear blade 17a and the shear blade 23a is cut, or stamped out in a generally rectangular shape by the lower shear blades 17a and 23 and the upper shear blades 26a and 27.

Figure 7:
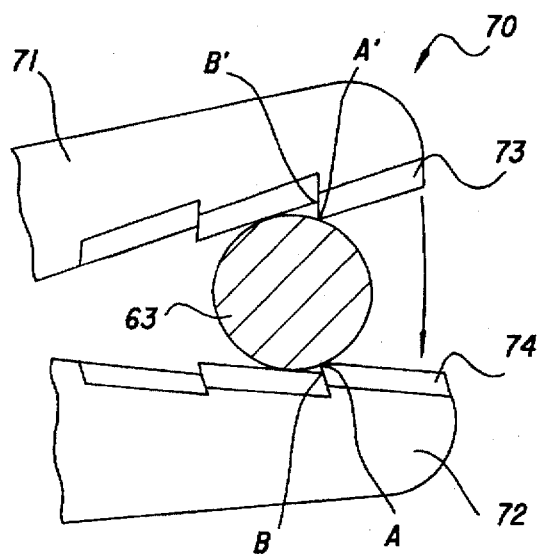
FIG. 7 shows a fragmental side view of an example of a conventional shearing machine.

In the present invention, since the upper and lower shear blades 17a, 17b, 17c, 26a, 26b, 26c are arranged such that the arrangement thereof forms a convexity curved in an opening direction of the jaw members 5, 6, the contact angle α (shown in FIG. 4) between the object to be sheared and the shear blade is larger than that in the conventional shearing machine shown in FIG. 7. Therefore, the object to be sheared 29 receives a negligible forward horizontal component of a shearing force, but rather receives a backward pulling force. Thus, with the object to be sheared 29 kept in the original position, the object 29 can be smoothly sheared without slipping. At this time, the front edge portions B, B' of the shear blades 17a, 17b, 17c, 26a, 26b, 26c receives a backward pushing pressure, but the amount of the pressure is rather small. And, this structure allows one to attach a stopper firmly behind the most rearward shear blade. Therefore, each of the shear blades 17a, 17b, 17c, 26a, 26b, 26c can be prevented from coming off.

Figure 8:
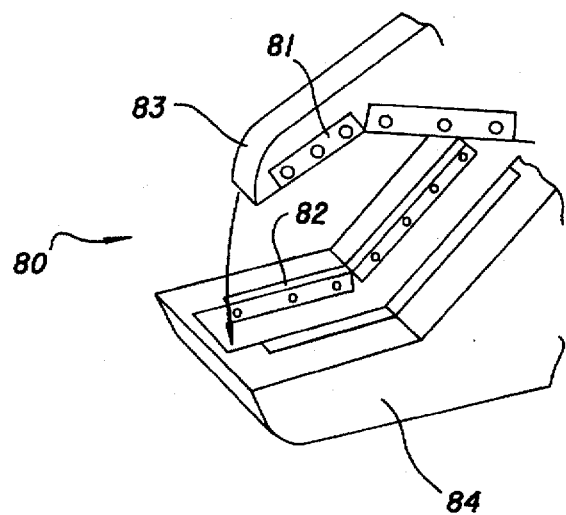
FIG. 8 shows a fragmental perspective view of an example of a conventional shearing machine.
Figure 9:
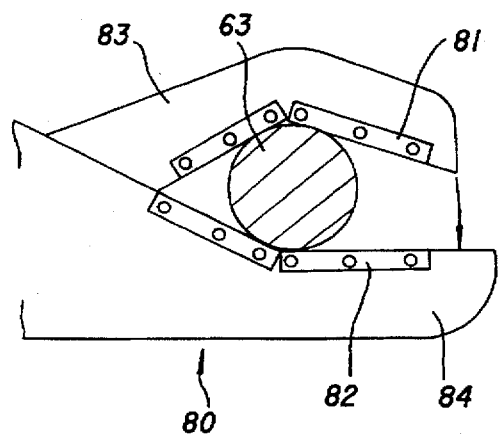
FIG. 9 shows a fragmental side view of a conventional shearing machine when shearing an object to be sheared.

Since at least two contact portions B, B', among contact portions of the shear blades 17a, 17b, 17c, 26a, 26b, 26c, constitute front end lines at the front edge corners of the respective shear blade, the shear blades easily cut into the object to be sheared 29, thereby enabling the required power to be decreased, compared to a conventional shearing device shown in FIGS. 8 and 9 in which all contact portions of each blade are flat faces.

Figure 5:
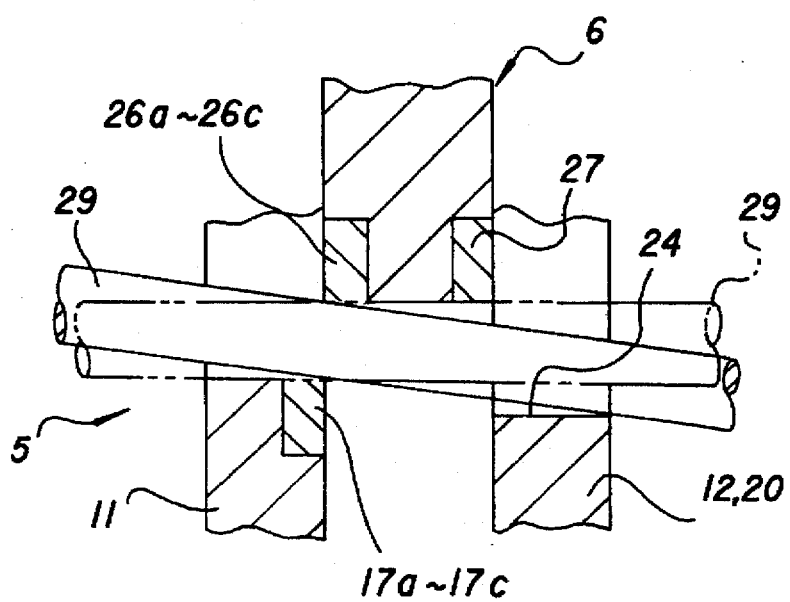
FIG. 5 shows a vertical sectional view of the shearing machine according to the present invention when shearing the object to be sheared.
Figure 6:
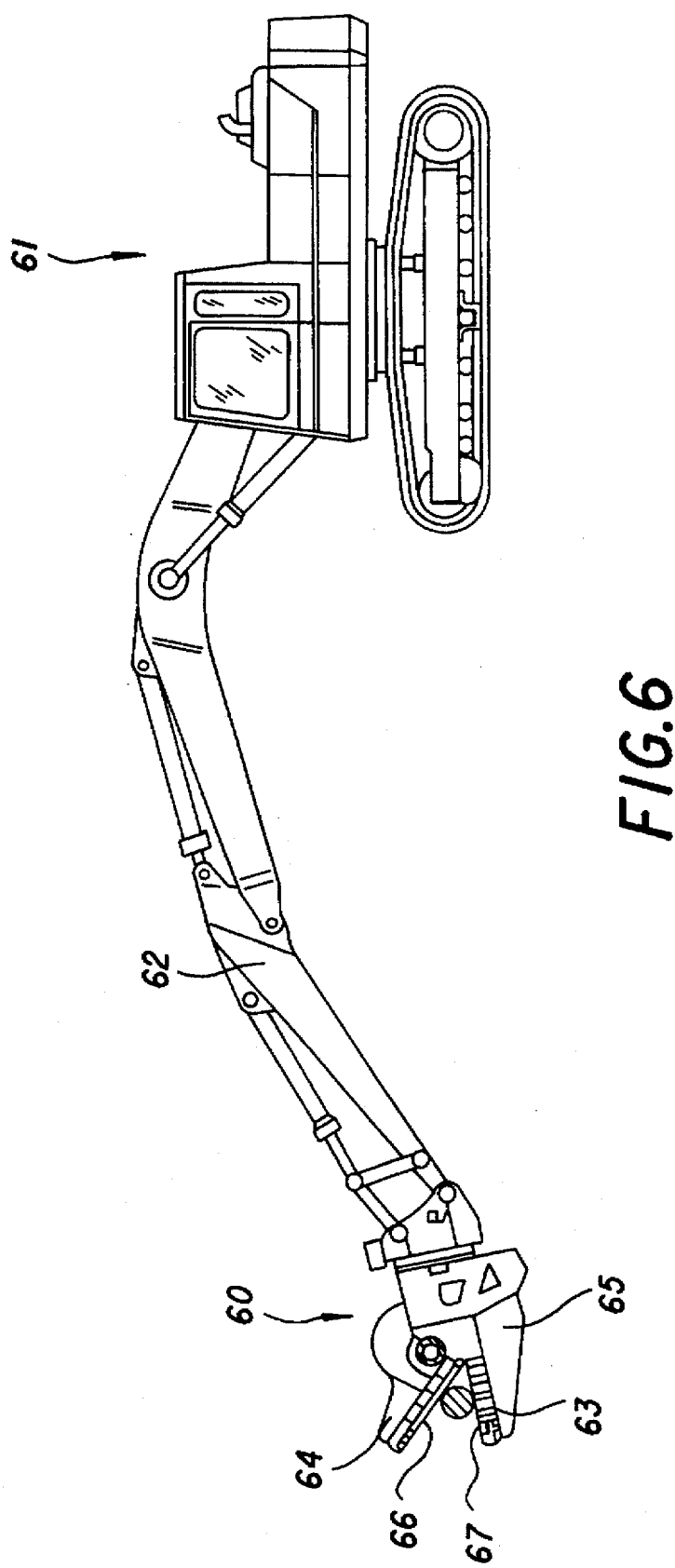
FIG. 6 shows a side view showing a normal usage of the shearing machine according to the present invention.

In the present invention, the supporting surface 24 is formed to be lower than the upper surface of the shearing side plate 11 by forming the upper surface of the base portion 20 of the protruding portion 15 to be positioned lower than the upper surface of the blade mounting portion 21 and by forming the supporting side plate 12 to be positioned lower than the shearing side plate 11. Thus, the object to be sheared 29 is set inclined between the upper and lower shear blades 17a, 17b, 17c, 26a, 26b, 26c as shown in FIG. 5. Therefore, the upper and lower shear blades 17a, 17b, 17c, 26a, 26b, 26c contact the object 29 along side edge lines, thereby enabling the shear blades 17a, 17b, 17c, 26a, 26b, 26c to easily cut into the object to be sheared 29. Thus, the object 29 can be reliably sheared with less power. Whereas, in accordance with most conventional shearing machines, the upper surface of the shearing side plate 11 and the supporting face 24 would be positioned at a common level (see two dot-dash lines in FIG. 5) and the upper and lower shear blades would contact the object along flat faces. Thus, a larger amount of shearing power would be required.

In the present invention, the leading edge portion of the lower jaw member 5 is arranged on an open and close trajectory of the leading edge portion of the upper jaw member 6, and the leading edge portion of the lower jaw member 5 is divided into two parts, wherein the upper nose faces of the two parts are arranged on a common plane. Therefore, the shearing machine 1 can securely lift a demolished structure, or the like, on the ground. That is, the lifted demolished structure, or the like, is supported by the three portions, i.e., two portions of the lower jaw member 5 (the leading edge portion of the shearing side plate 11 and the blade mounting portion 21) and one portion of the upper jaw member 6 (the leading edge portion of the upper jaw member 6). Therefore, demolished parts lying on the ground and/or structures installed near the ground can be picked up and surely sheared. The lifted demolished structures can also be easily carried to another place without being sheared.

Since the rotation braking mechanism is interposed between the bracket 2 and the shearing machine body 3, a rotational force applied to the shearing machine body 3 exceeding a certain amount makes the shearing machine body 3 rotate around the axis X—X to the most appropriate orientation. Even in the event that a large rotational moment acts on both the lower and upper jaw members 5, 6 when shearing and the shearing cannot be easily accomplished because the lower and upper jaw members 5, 6 are away from each other, the rotation braking mechanism absorbs the torsion of the jaw members to effect a normal shearing operation at an optimized angle. The same result can also be obtained by mounting a hydraulic motor between the shearing machine body 3 and the bracket 2, which can change the orientation of the shearing machine body 3 by rotating the hydraulic motor forward or reversely.

As mentioned above, according to the present invention, the object 29 to be sheared can be smoothly sheared while keeping the object stationary at the original position not to cause slipping thereof. At this time, the front edge portions of the shear blades receive backward pushing pressure, but the amount of the pressure is rather small. And, this structure allows to attach a stopper firmly behind the most rearward shear blade. Therefore, each shear blade is prevented from coming off.

Since at least two contact portions, among contact portions of the shear blades, which contact the object to be sheared constitute edge lines at the front edge of the shear blade, the shear blades easily cut into the object to be sheared, thereby enabling the required power to be decreased, compared to a conventional shearing machine in which all contact portions of each blade and an object to be sheared are flat faces.

When the leading edge portion of one of the jaw members is arranged on an open and close trajectory of the leading edge portion of the other jaw member, and the leading edge portion of one of the jaw members is divided into two parts, and that the upper nose faces of the two parts are arranged on a common plane, the shearing machine can securely pick up a demolished structure, or the like, on the ground. Therefore, demolished parts lying on the ground and/or structures installed near the ground can be picked up and surely sheared. The lifted demolished structures can also be easily carried to another place without being sheared.

When at least one of the jaw members is equipped with a supporting face stepped toward an opening direction of the jaw members compared with the cutting edges of the shear blade attached on the jaw member, the object to be sheared is set declined between the upper and lower shear blade. Thus, the upper and lower shear blades contact the object to be sheared along edge lines, thereby enabling the shear blades to easily cut into the object to be sheared. Thus, the object can be reliably sheared with less power.

When a rotation braking mechanism is interposed between the bracket and the shearing machine body to fasten the shearing machine body to the bracket until a certain amount of rotational force is applied to the shearing machine body, a rotational force applied to the shearing machine body exceeding a certain amount rotates the shearing machine body for shearing at the most appropriate orientation. Even in the event that a large rotational moment acts on both of the jaw members when shearing, the rotation braking mechanism absorbs the torsion of the jaw members to effect a normal shearing operation at an optimized angle. Thus, an object to be sheared can be easily cut regardless of the orientation thereof.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A shearing machine comprising:
    a shearing machine body having a pair of jaw members rotatably connected with each other so as to open and close like scissors;
    a plurality of shear blades arranged in series on each occluding portion of said jaw members;
    a bracket for rotatably supporting said shearing machine body, said bracket being attached to an arm of a work machine;
    wherein said shear blades mounted on said each jaw member are arranged such that the arrangement of cutting edges of said shear blades forms a convexity curved in an opening direction of said jaw members with the front edge portion of at least one of said shear blades inwardly protruded compared to an adjacent rear edge portion of one of said forward adjacent shear blades.

2. A shearing machine as recited in claim 1, wherein a leading edge portion of one of said jaw members is arranged on an open and close trajectory of a leading edge portion of the other jaw member, wherein one of said leading edge portions is divided into two parts so as to fit the other leading edge portion therebetween, and wherein upper nose faces of said two parts are arranged on a common flat plane.

3. A shearing machine as recited in claim 1, wherein at least one of said jaw members is equipped with a supporting face stepped outward in an open-close direction of said jaw members compared to said cutting edges of said shear blades attached on at least one of said jaw members.

4. A shearing machine as recited in claim 1, further comprising a rotation braking mechanism interposed between said bracket and said shearing machine body to fasten said shearing machine body to said bracket until a certain amount of rotational force is applied to said shearing machine body.

5. A shearing machine as recited in claim 1, wherein said shearing machine body comprises a hollow base member, a lower of said jaw members fixed to said base member, and an upper of said jaw members rotatably connected to a main shaft attached to said lower jaw member, wherein a proximal end portion of said upper jaw member is rotatably connected to a leading end of a piston rod of a hydraulic cylinder equipped in said base member so as to open and close said upper jaw member about said still lower jaw member.

6. A shearing machine as recited in claim 5, wherein said lower jaw member comprises a pair of side plates, a connection plate interposed between and connecting said side plates and a protruding portion which forwardly protrudes along one of said side plates.

7. A shearing machine as recited in claim 6, wherein said one of side plates is equipped with, at the upper inside portion thereof, said shear blades arranged in series, and an upper edge face of said one of side plates is formed staircase-fashion in conformity with cutting edges of said shear blades.

8. A shearing machine as recited in claim 6, wherein said protruding portion consists of a base portion and a blade mounting portion formed on a leading edge of said base portion, an upper surface of said base portion being positioned lower than an upper surface of said blade mounting portion.

9. A shearing machine as recited in claim 5, wherein said upper jaw member is equipped with, at the lower outside portion thereof, said plurality of shear blades arranged in series, and a lower edge face of said upper jaw member is formed staircase-fashion in conformity with cutting edges of said shear blades.

10. A shearing machine as recited in claim 1, wherein each shear blade mounted on leading edge portions of said jaw members is shaped in the form of a parallelogram having a sharp leading edge.

11. A shearing machine comprising:
a shearing machine body having an upper jaw member rotatably connected to a lower jaw member so as to open and close like scissors, said lower jaw member having a leading edge portion arranged on an open and close trajectory of a leading edge portion of said upper jaw member, said lower jaw member being divided into two parts so as to fit a leading edge portion of said upper jaw member therebetween, wherein upper nose faces of said two parts are arranged on a common flat plane;
a plurality of shear blades arranged in series on each occluding portion of said upper and lower jaw members;
a bracket for rotatably supporting said shearing machine body, said bracket being attached to an arm of a work machine;
wherein said shear blades mounted on said upper and lower jaw members are arranged such that the arrangement of cutting edges of said shear blades forms a convexity curved in an opening direction of said jaw members with the front edge portions of said shear blades inwardly protruded compared to an adjacent rear edge portion of said any adjacent forward one of shear blades.

12. A shearing machine as recited in claim 11, wherein said lower jaw member is equipped with a supporting face stepped downwardly compared to a cutting edge of at least one of said shear blades attached on said lower jaw member.

* * * * *